(12) United States Patent
Zuzarte et al.

(10) Patent No.: US 8,572,067 B2
(45) Date of Patent: Oct. 29, 2013

(54) METHOD TO ESTIMATE THE NUMBER OF DISTINCT VALUE COMBINATIONS FOR A SET OF ATTRIBUTES IN A DATABASE SYSTEM

(75) Inventors: Calisto Paul Zuzarte, Pickering (CA); Xiaohui Yu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1112 days.

(21) Appl. No.: 11/375,659

(22) Filed: Mar. 14, 2006

(65) Prior Publication Data
US 2007/0220017 A1 Sep. 20, 2007

(51) Int. Cl.
*G06F 17/00* (2006.01)
(52) U.S. Cl.
USPC ............ 707/715; 707/714; 707/756; 707/792
(58) Field of Classification Search
None
See application file for complete search history.

(56) References Cited

U.S. PATENT DOCUMENTS

| | | | |
|---|---|---|---|
| 4,956,774 A | 9/1990 | Shibamiya et al. | |
| 5,469,568 A | 11/1995 | Schiefer et al. | |
| 5,761,653 A * | 6/1998 | Schiefer et al. | 707/713 |
| 6,615,222 B2 | 9/2003 | Hornibrook et al. | |
| 6,738,755 B1 | 5/2004 | Freytag et al. | |
| 2004/0181521 A1* | 9/2004 | Simmen | 707/3 |
| 2004/0267713 A1* | 12/2004 | Chaudhuri et al. | 707/3 |
| 2005/0071377 A1* | 3/2005 | Mihcak et al. | 707/104.1 |
| 2005/0209994 A1* | 9/2005 | Noro et al. | 707/1 |

OTHER PUBLICATIONS

Yu et al., "Towards Estimating the Number of Distinct Value Combinations for a Set of Attributes," Oct. 2005, ACM, pp. 656-663.*
Deshpande et al., "Independence is Good: Dependency-Based Histogram Synopses for High-Dimensional Data," May 2001, ACM, pp. 199-210.*
Cosar et al.,"Multiple Query Optimization with Depth-First Branch-and-Bound and Dynamic Query Ordering," ACM, 1993.*
Christodoulakis, Stavros, "On the Estimation and Use of Selectivities in Database Performance Evaluation," Department of Computer Science, University of Waterloo, 1989.*
Poosala et al., "Selectivity Estimation Without the Attribute Value Independence Assumption," Proceedings of the 23rd VLDB Conference, 1997.*
Xiaohu Yu et al., Towards Estimating the Number of Distinct Value Combinations for a Set of Atributes.
Rafiul Ahad, et al., "On Estimating the Cardinality of the Projection of a Database Relation," ACM Transactions on Databases, vol. 14, No. 1, Mar. 1989, pp. 28-40.
Allen Van Gelder, "Multiple Join Size Estimation by Virtual Domains," (extended abstract), Proc. of ACM PODS Conference, Washington, D.C., May 1993, pp. 180-189.

(Continued)

*Primary Examiner* — Mohammad S Rostami
(74) *Attorney, Agent, or Firm* — Sawyer Law Group, P.C.

(57) ABSTRACT

A method to estimate the number of distinct value combinations for a set of attributes in a database system is disclosed. The method comprises utilizing frequency information within the set of attributes to provide a best estimate for the number of distinct value combinations. In a preferred embodiment, the utilizing step comprises estimating the number of distinct value combinations utilizing frequency information of the set of attributes based upon probability theory and further includes providing bounds on the distinct value information combinations utilizing the frequency information of the set of attributes. In so doing, an estimate for the number of distinct value combinations is provided.

14 Claims, 4 Drawing Sheets

(56) References Cited

OTHER PUBLICATIONS

Viswanath Poosala, et al., "Selectivity Estimation Without the Attribute Value Independence Assumption," Proc. of the 23rd conference on Very Large Data Bases, Athens, Greece, 1997, pp. 486-495.

B. Muthuswamy, et al., "A Detailed Statistical Model for Relational Query Optimization," Proc. Of the ACM Annual Conference, Denver, Oct. 1985, pp. 439-448.

David Simmen, et al., "Fundamental Techniques for Order Optimization," Proc. 1996 ACM SIGMOD Conf., May 1996, pp. 57-67.

\* cited by examiner

METHOD TO ESTIMATE THE NUMBER OF DISTINCT VALUE COMBINATIONS FOR A SET OF ATTRIBUTES IN A DATABASE SYSTEM

FIELD OF THE INVENTION

The present invention relates in general to database management systems performed by computers, and in particular, to the optimization of queries.

BACKGROUND OF THE INVENTION

Computer systems incorporating Relational Database Management System (RDBMS) software using a Structured Query Language (SQL) interface are well known in the art. The SQL interface has evolved into a standard language for RDBMS software and has been adopted as such by both the American National Standards Institute (ANSI) and the International Standards Organization (ISO).

A query optimizer function in the RDBMS is responsible for translating SQL statements into an efficient query execution plan (QEP). The QEP dictates the methods and sequences used for accessing tables, the methods used to join these tables, the placement of sorts, where predicates are applied, and so on. The QEP is interpreted by the RDBMS when the query is subsequently executed.

There may be a large number of feasible QEPs, even for a simple query. The optimizer determines the best of these alternatives by modeling the execution characteristics of each one and choosing the QEP that minimizes some optimization goal such as response time or use of system resources. See e.g., P. Griffiths Selinger, M. M. Astrahan, D. D Chamberlin, R. A. Lorie, and T. G. Price, "Access Path Selection in a Relational Database Management System", *Procs.* 1979 *ACM SIGMOD Conf.* (May 1979), pp. 23-34 (hereinafter referred to as [Selinger 79]).

The optimizer may choose to minimize some estimated cost metric, such as resource consumption or elapsed time, wherein the most important factor in accurately computing any cost used during optimization is a cardinality estimate. The pioneering work in estimating the cardinality of a plan in an incremental fashion was described in [Selinger 79]. However, this work assumed that each predicate was independent and that values were distributed uniformly.

U.S. Pat. No. 4,956,774, issued September 1990 to Akira Shibamiya and R. Zimowski, entitled "Data base optimizer using most frequency values statistics" (hereinafter referred to as [Shibamiya 90], kept frequency statistics to drop the assumption of uniformity, but did not deal with the independence assumption.

U.S. Pat. No. 5,469,568, issued Nov. 21, 1995, to K. Bernhard Schiefer and Arun Swani, entitled "Method for choosing largest selectivities among eligible predicates of join equivalence classes for query optimization" (hereinafter referred to as [Schiefer 95]), derived a technique for computing cardinalities of joins only when the join (i.e., single-table) predicates and predicates whose correlation are somewhere between completely redundant and completely independent.

Rafiul Ahad, K. V. Bapa Rao, and Dennis McLeod, "On Estimating the Cardinality of the Projection of a Database Relation", *ACM Transactions on Databases*, Vol. 14, No. 1 (March 1989), pp. 28-40 (hereinafter referred to as [ARM 89]), exploited multivariate distributions of the values in the database and semantic constraints to estimate the size of a query when correlations can occur, but only for a single table having no duplicate rows (which SQL allows).

Allen Van Gelder, "Multiple Join Size Estimation by Virtual Domains" (extended abstract), *Proc. of ACM PODS Conference, Washington, D.C.* (May 1993), pp. 180-189 (hereinafter referred to as [VG 93]), adjusted the selectivity of individual predicates based upon correlation statistics, so that the state-of-the-art techniques can be used unchanged. However, such adjustments underestimate the cardinality for the partial QEPs applying some proper subset of such correlated predicates.

Viswanath Poosala and Yannis E. Ioannidis, "Selectivity Estimation Without the Attribute Value Independence Assumption", *Proc. of the 23$^{rd}$ Conference on Very Large Data Bases, Athens, Greece* (1997), pp. 486-495 (hereinafter referred to as [PI 97]), also exploited multi-variate distributions on two attributes only, summarized as 2-dimensional histograms that are further compressed using singular-value decomposition, but does not deal with equality predicates (the most common form of predicates, especially for joins) or correlations among more than two predicates.

Other references of interest include: B. Muthuswamy and L. Kerschberg, "A Detailed Statistical Model for Relational Query Optimization", *Proc. Of the ACM Annual Conference, Denver* (October 1985), pp. 439-448 (hereinafter referred to as MK 85); and David Simmen, Eugene Shekita, and Timothy Malkemus, "Fundamental Techniques for Order Optimization", *Proc.* 1996 *ACM SIGMOD Conf.* (May 1996), pp. 57-67 (hereinafter referred to as [Simmen 96]).

Notwithstanding these various prior art methods, there exists a need in the art for improved techniques for optimizing queries, especially through the use of estimated cardinality.

Query optimizers in relational database management systems rely on cost estimation to choose the best physical execution plan for a query. The accuracy of cost estimation is thus of critical importance because cost of plans can differ considerably and choosing a bad plan might result in extremely poor performance. One of the key elements in cost estimation for queries is the estimation of the number of distinct values in a set of attributes, and it has received considerable attention in the literature and commercial systems. For example, it may be interesting to estimate the number of groups that have the same "color" and "size" of a product. Wrong cardinality estimates often lead to poor choices for operation strategies involving the sets of attributes as well as poor access plan choices for subsequent portions of the plan.

Existing database query optimizers focus on the estimation of number of distinct values for a single attribute, while the problem of estimating the number of distinct value combinations in a set of attributes remains elusive. Conventional commercial database systems use pre-computed sets of attributes statistics that are computed by scanning the data. This could be done easily when a multi-attribute index is used to do the counting. The statistics could also be computed when the values in the attributes are "concatenated" in some way to compute the number of distinct values in a way similar to computing the distinct values in a single attribute. The main problem with pre-computed sets of attributes is that one has to know in advance which sets of attributes are of interest. This is not easily possible when the number of permutations and combinations of the sets of attributes is large. Various methodologies might be used in order to decide the interesting combinations including preprocessing the workload of queries or as some sort of feedback mechanism for future queries from looking at estimates versus the actual cardinalities of past queries.

The above methods do not lend themselves to arbitrary ad hoc queries. A method which uses the typical statistics that are collected on individual attributes used today is very primitive. In general, the product of the individual attribute distinct values produces the maximum number of possible combinations.

Accordingly, what is needed is a system and method for more accurately estimating the number of distinct values of combinations for a set of attributes in a database system. The present invention addresses such a need.

SUMMARY OF THE INVENTION

A method to estimate the number of distinct value combinations for a set of attributes in a database system is disclosed. The method comprises utilizing frequency information within the set of attributes to provide an estimate for the number of distinct value combinations. In a preferred embodiment, the utilizing step comprises estimating the number of distinct value combinations utilizing frequency information of the set of attributes based upon probability theory and further includes providing bounds on the distinct value information combinations utilizing the frequency information of the set of attributes. In so doing, an estimate for the number of distinct value combinations is provided.

DETAILED DESCRIPTION OF THE INVENTION

The present invention relates in general to database management systems performed by computers, and in particular, to the optimization of queries. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
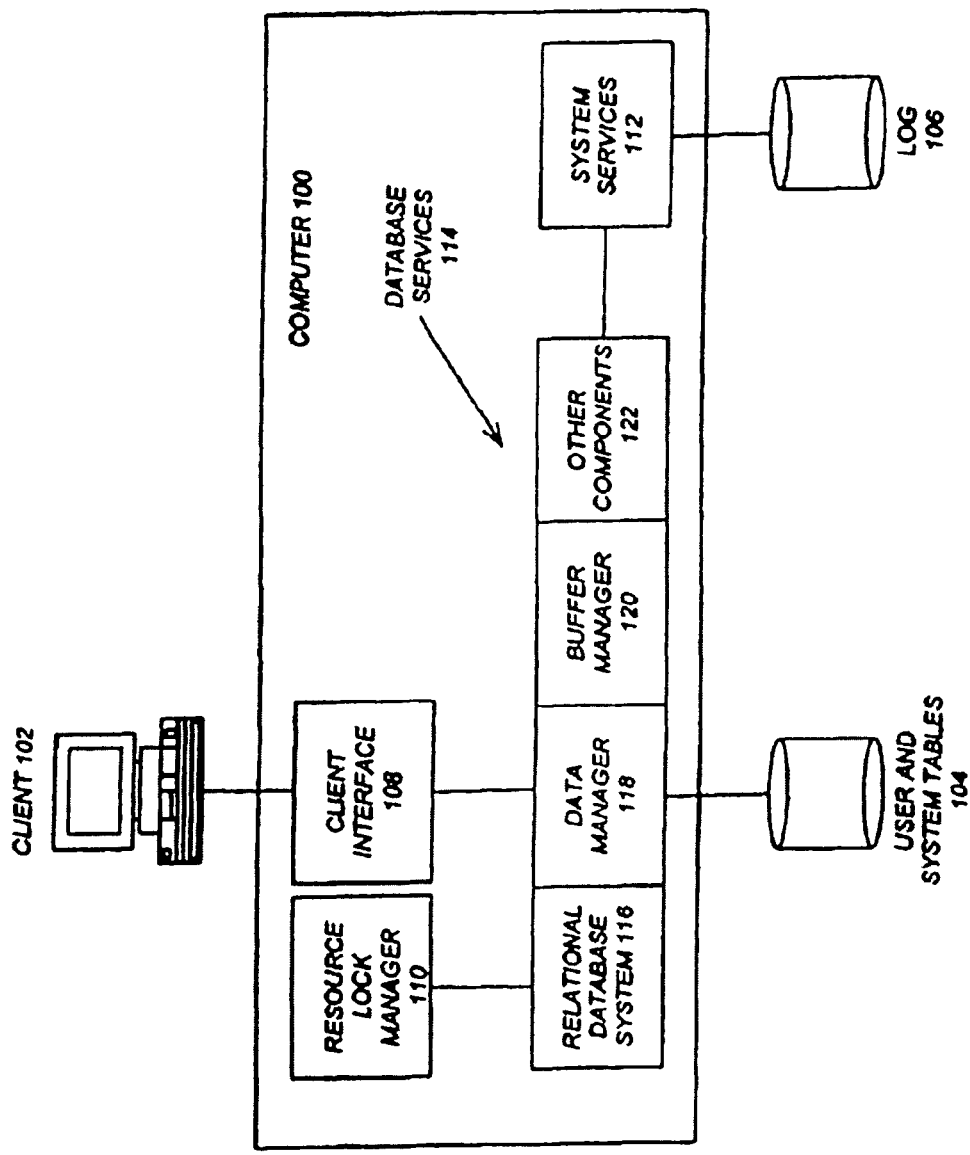
FIG. 1 illustrates the computer hardware environment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the IBM® DB2® Universal Database™ (DB2 UDB) product offered by IBM Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, Buffer Manager 120, and Other Components 122 such as an SQL compiler/interpreter. These submodules support the functions of the SQL language, i.e., definition, access control, retrieval, and update.

Generally, the RDBMS comprises logic and/or data that are embodied in or retrievable from a device, medium, or carrier, e.g., a fixed or removable data storage device, a remote driver coupled to the computer by a data communications device, etc. Moreover, this logic and/or data, when read, executed, and/or interpreted by the computer 100, causes the computer 100 to perform the steps necessary to implement and/or use the present invention.

Thus, the present invention may be implemented as a method, system, or computer program product using standard programming and/or engineering techniques to produce software, firmware, hardware, or any combination thereof. In the form of a computer program product, it may be accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

Interactive SQL Execution

Figure 2:
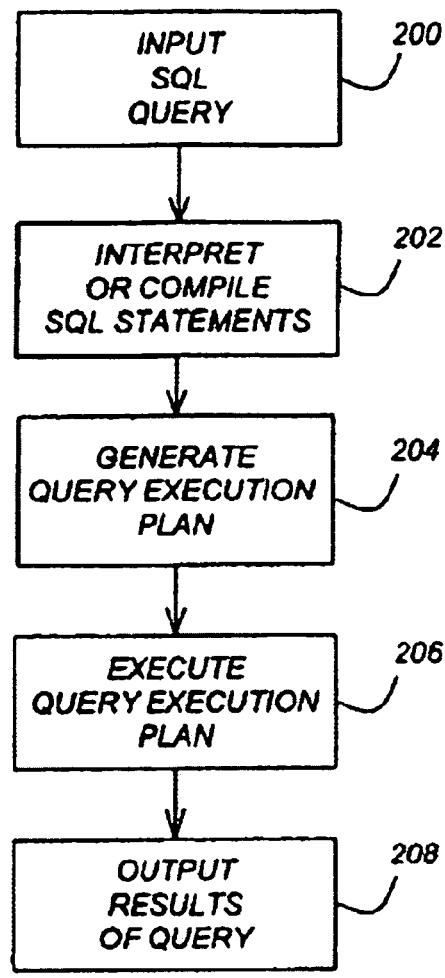
FIG. 2 is a flow chart illustrating the steps necessary for the interpretation and execution of SQL statements in an interactive environment according to the present invention.

FIG. 2 is a flow chart illustrating the steps necessary for the interpretation and execution of SQL statements in an interactive environment according to the present invention. Block 200 represents the input of SQL statements into the computer system 102. Block 202 represents the step of compiling or interpreting the SQL statements. Block 204 represents the step of generating a compiled set of runtime structures called a query execution plan from the compiled SQL statements. An optimization function at Block 204 may transform or optimize the SQL query in a manner described in more detail later in this specification. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular attribute, etc.) to choose what it considers to be the most efficient access path for the query. Block 206 represents the execution of the query execution plan and Block 208 represents the output of the results.

Embedded/Batch SQL Execution

Figure 3:
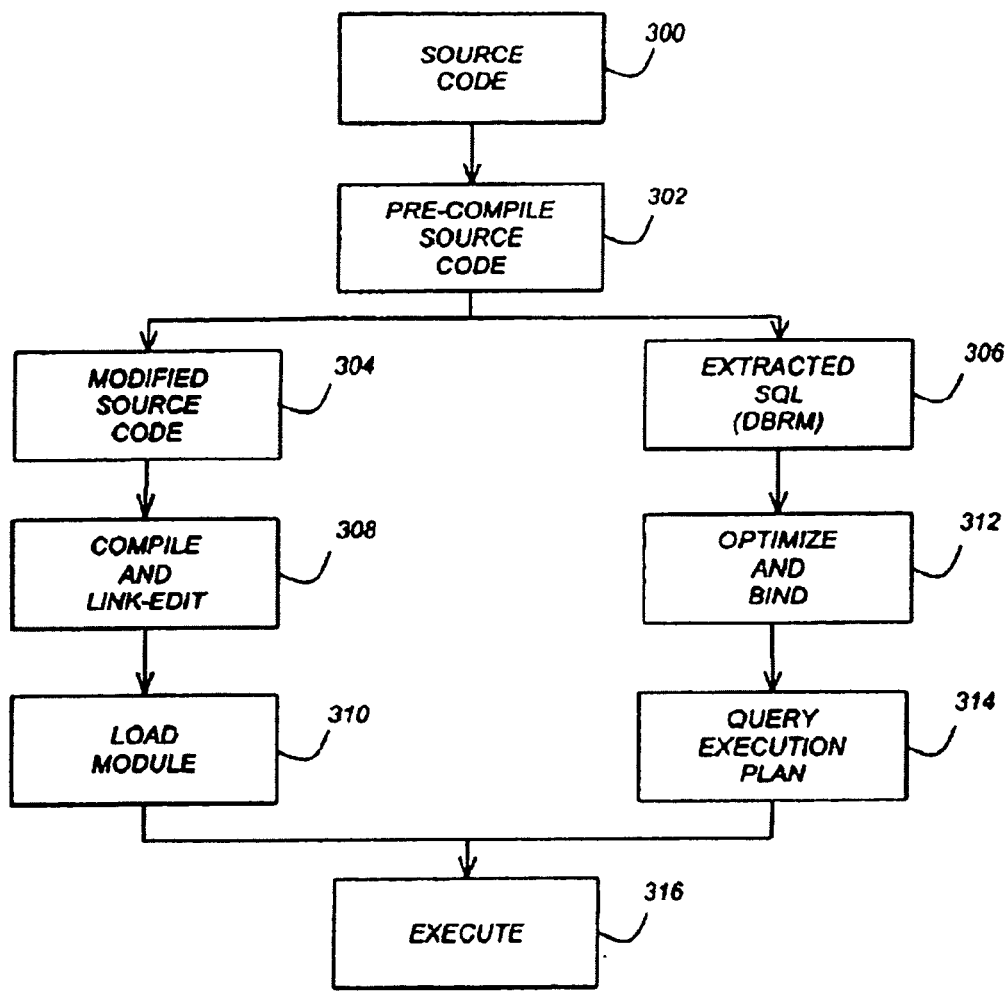
FIG. 3 is a flow chart illustrating the steps necessary for the interpretation and execution of SQL statements embedded in source code according to the present invention.

FIG. 3 is a flow chart illustrating the steps necessary for the interpretation and execution of SQL statements embedded in source code according to the present invention. Block 300 represents program source code containing a host language (such as COBOL or C) and embedded SQL statements. The program source code 300 is then input to a pre-compile step 302. There are two outputs from the pre-compile step 302: a modified source code module 304 and a Database Request Module (DBRM) 306. The modified source code module 304 contains host language calls to the RDBMS, which the pre-compile step 302 inserts in place of SQL statements. The DBRM 306 is comprised of the SQL statements from the program source code 300. A compile and link-edit step 308 uses the modified source code module 304 to produce a load module 310, while an optimize and bind step 312 uses the DBRM 306 to produce a compiled set of runtime structures for the query execution plan 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular attribute, etc.), to choose what it considers to be the most efficient access path for the query. The load module 310 and query execution plan 314 are then executed together at step 316.

Current commercial databases may use attribute groups or multiple attribute index statistics in order to estimate distinct value combinations on multiple attributes for query execution pleas. However, attribute groups or multiple attribute index statistics are not always available, and it is not easy to decide what combinations one should collect statistics on, as the number of possible combinations can be huge. When there is no statistical information on the groups of attributes that are of interest, naive estimators currently used in commercial systems do not work well and often produce large errors.

In a method, computer program product, and system in accordance with the present invention, instead of extending the sampling approach from single-attribute to the multi-attribute case, the quality of estimation is improved by making use of existing statistical frequency information on individual attributes, which is usually maintained by the DBMS, for example in a system catalog, and readily available. Compared with the sampling approach, an approach in accordance with the present invention does not require physical access to the data through disk I/O, and therefore is more efficient.

Before proceeding to describe the features of the system and method in accordance with the present invention, the problem of estimating the number of distinct value combinations for a set of attributes is described below.

Definition (number of distinct value combinations). Given a selected set of attributes $G=(A_1, A_2 \ldots, A_m)$ in a relation R, the number of distinct value combinations for G is defined as the number of distinct tuples in $\pi GR$ (the projection of R on G).

$d_i (1 \leq i \leq m)$ is utilized to denote the number of distinct values in attribute $A_i (1 \leq i \leq m)$ in G, and $D_G$ is utilized to denote the number of distinct value combinations. Assuming an (arbitrary) total ordering on the values in each attribute, vector $v=(v_1, v_2, \ldots, v_m)$ denotes the value combination that takes on the $v_1$-th value in attribute $A_1$, $v_2$-th value in attribute $A_2$, and so on. V denotes the set of all value combinations present in $\pi GR$; hence $D_G=|V|$. Let $f_v$ be the normalized frequency of the value combination of V such that $\Sigma_{v \in V} f_v = 1$.

Estimating the Conventional Number of Distinct Value Combinations for a Set of Attributes In this embodiment the frequencies of the attributes are known, i.e., the frequency vector $f_i$ for each attribute $A_i \in G$ (i=1, ..., m) is known. Here the frequency vector $$f_i = (f_{i1}, f_{i2}, \ldots, f_{id_i}) \left( \sum_{j=1}^{d_i} f_{ij} = 1 \right),$$

with $f_{ij}$ being the fraction of tuples having the j-th value of attribute $A_i$. As an example, if there are three distinct values in Attribute $A_i$, and they appear in R 20, 40 and 140 times respectively, then $f_i=(0.1, 0.2, 0.7)$.

When there exist functional dependencies among the attributes in G, they can be effective utilized to obtain accurate estimates. For example, if it is desired to estimate the Column Set Cardinality (COLSCARD) for the set of attributes $(A_1, A_2)$, and there happens to exist a functional dependency $A_1 \rightarrow A_2$, then clearly the COLSCARD is equal to $d_1$, the number of distinct values in $A_1$.

Naive Estimators

Assuming the data in different attributes are independently distributed, the total number of possible value combinations would be $$\prod_{i=1}^{m} d_i.$$

This might be utilized as an estimate of the COLSCARD. In fact, a naive estimator, which is currently used in a database system may be the following:

$$D_G = \min\left\{\prod_{i=1}^{m} d_i, N\right\} \quad (1)$$

where N is the size of the table, and serves as a "sanity" bound because $D_G$ cannot be greater than the table size.

However, such an estimator is problematic in that it is just the maximum possible number of value combinations for G; when N=|R| is small, some less frequent value combinations may not appear in the relation at all.

EXAMPLE

Suppose the COLSCARD for two attributes $A_1$ and $A_2$ needs to be estimated, and it is known that $f_1$=(0.4, 0.4, 0.2) and $f_2$=(0.8, 0.1, 0.1).

Scenario 1: N=10. One possibility might be to estimate the number of possible value combinations to be 3×3=9. However, the known f's imply that the probability of occurrence of the least possible value combination is $f_{13} \times f_{23}$=0.2×0.1=0.02, which indicates that such a value combination is very unlikely to appear in a relation of size N=10. Therefore, the expected number of value combinations is expected to be less than 9.

Scenario 2: When N is less than $$\prod_{i=1}^{m} d_i,$$

e.g., N=8, the estimated number of possible combinations needs to be "truncated" from 9 to 8, as it cannot be greater than N. The problem is that, with a relation of size 8, some value combinations with small occurrence probabilities to appear are not expected to appear (e.g., the above combination with probability 0.02. So again, the expected number of value combinations is expected to be less than the maximum possible number, 8.

Figure 4:
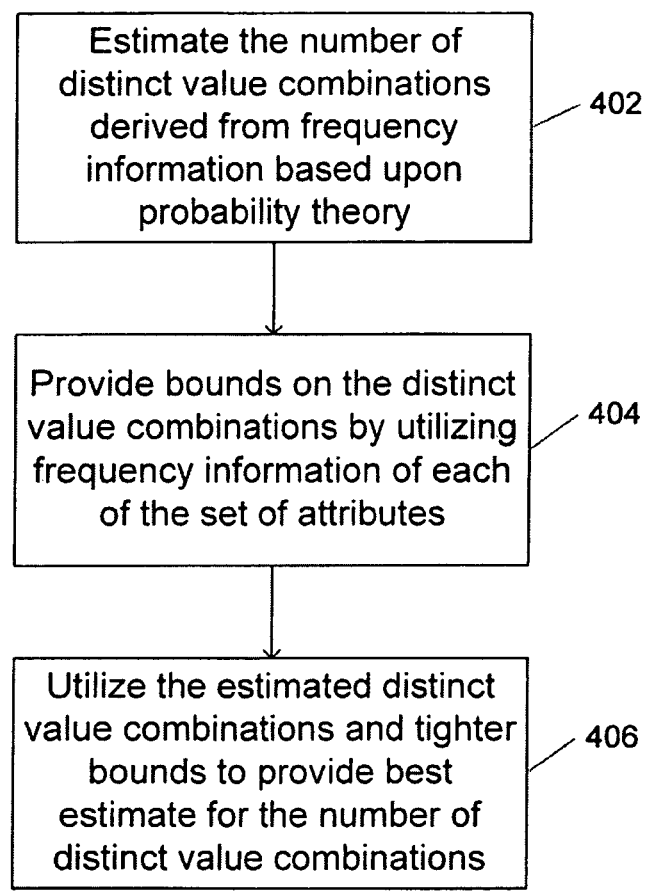
FIG. 4 is a simple flow chart for estimating the number of distinct value combinations for a set of attributes.

As shown in the example, using the naive estimator is often erroneous, and better estimates are desired. FIG. 4 is a simple flow chart for estimating the number of distinct value combinations for a set of attributes. As is seen, the number of distinct value combinations derived from the frequency information is estimated based upon probability theory, via step 402. Bounds are provided on the distinct value combinations by exploiting frequency information of each of the set of attributes, via step 404. Finally, the estimated distinct value combinations and the tighter bounds may be utilized to provide an improved (bounded) estimate for the number of distinct value combinations, via step 406.

To further describe the features of the present invention in more detail, refer now to the following description.

Estimating the number of distinct value combinations based upon probability theory.

An embodiment of this invention is directed to a method to estimate $D_G$ based on an application of probability theory. Let $f_G = f_1 \otimes f_2 \otimes \ldots \otimes f_m$ be the Kronecker product (also known as direct product, tensor product, or outer product) of the frequency vectors of all attributes. Then $f_G$ is a vector of length $$M = \prod_{i=1}^{m} d_i.$$

Note that each element of $f_G$ represents the frequency $f_v$ of a specific value combination v. Clearly, the individual components of the vector $f_G$ add up to 1, i.e., $\Sigma_{v \in C}=1$, For instance, in the above example, $f_G$=(0.32, 0.04, 0.04, 0.32, 0.04, 0.04, 0.16, 0.02, 0.02), and it is easy to verify that they sum up to 1.

If each element of $f_G$ is considered as the probability of occurrence of the corresponding value combination, and each tuple in the relation R as independently drawn from M possible value combinations, then the following theorem for estimating COLSCARD is established:

Theorem 1. Under the following assumptions:

1. The data distributions of individual attributes in G are independent,

2. For the value combination v, its occurrence is the result of an independent Bernoulli trial, with the success (occurrence) probability $f_v$, and 3. The occurrences of individual possible value combinations are independent.

The expected number of distinct value combinations is:

$$E[D_G] = M - \sum_{v \in v} (1 - f_v)^N.$$

To describe an example utilizing this equation refer now to the following.

As the previous example, suppose there is a need to estimate the COLSCARD for three attributes $A_1$, $A_2$, and $A_3$, and $f_1$=(0.4, 0.4, 0.2) and $f_2$=(0.8, 0.1, 0.1). Assume that there are 10 rows in the table, i.e., N=10. The naive method provides 9 (3 times 3) distinct values.

Assuming that $A_1$ takes on 3 values X, Y and Z, and $A_2$ has three values P and Q and R, the algorithm involves first computing a vector $f_v$ that is obtained by multiplying the individual frequencies in each of the vectors $f_1$ and $f_2$. The combination $A_1$=X and $A_2$=P has probability $f_{11} * f_{21}$=0.4*0.8=0.32.

The combination with $A_1$=X and $A_2$=P has probability $f_{11} * f_{22}$=0.4*0.01 =0.04.

The combination with $A_1$=X and $A_2$=Q has probability $f_{11} * f_{23}$=0.4*0.1=0.04, and so on, resulting in the kronecker product vector $f_v$ which is (0.32, 0.04, 0.04, 0.32, 0.04, 0.04, 0.16, 0.02, 0.02).

Given the independence assumptions in Theorem 3, our formula for the expected number of distinct value combinations is $D_G$=M−SUM where SUM is the sum of all the probabilities that value combinations do not occur in the table i.e., $$SUM = \sum_{v \in v} (1 - f_v)^N.$$

The way this above formula is derived is as follows:

If each tuple in R is thought of as independently drawn from M possible value combinations, then the probability of value combination v not chosen in any particular draw is $(1-f_v)$. So for the first combination with $A_1$=X and $A_2$=P, the probability that this does not occur in the first row of the table is (1−0.32). The probability that this value combination does not occur in N rows of the table is $(1-0.32)^N$, resulting in the probability that the value combination does not exist in the table.

The probability for all the value combinations are added together to provide SUM. Then SUM in this example is $(1-0.32)^{10}+(1-0.04)^{10}+(1-0.04)^{10}+(1-0.32)^{10}+(1-0.04)^{10}+(1-0.04)^{10}+(1-0.16)^{10}+(1-0.02)^{10}+(1-0.2)^{10}=0.211+0.665+0.0211+0.665+0.665+0.151+0.689+0.689\approx=4.61$. Accordingly, the $D_G$ in this embodiment $10-4.61\approx=5.39$. Accordingly, an estimate of the number of distinct values is 5.39, based on the assumptions set out earlier. Therefore, this number can be utilized in the cost estimation of the execution plan of a query.

Tighter upper and lower bounds of the cost can also be provided in conjunction with the above identified calculations to obtain an improved (bounded) estimate. An example of these tighter bounds and how they would be utilized to improve the accuracy of the estimation of distinct value combinations is described in detail herein below.

Upper/Lower Bounds on COLSCARD

Naturally, for the set of attributes $G=(A_1, A_2, \ldots, A_m)$, COLSCARD is lower-bounded by $\max\{d_1, d_2, \ldots d_m\}$, since it cannot be less than the number of distinct values in any of the constituent attributes. Moreover, as discussed earlier in this section, COLSCARD is upper-bounded by $$\min\left\{\prod_{i=1}^{m} d_i, N\right\}.$$

To illustrate this feature, the upper and lower bounds of two attributes are described.

The description herein below can be utilized with two attributes or any multiple of two attributes. Furthermore, it should be understood that even though the description below finds upper and lower bounds of two attributes or multiple of two attributes, one of ordinary skill in the art readily recognizes, other equations could be utilized which exploit the frequency information for other multiples of attributes and their use would be within the spirit and scope of the present invention.

The following theorems demonstrate this possibility, for 2 attributes.

Theorem 2. For attribute set $G=(A_1, A_2)$, define $l_{ij}$ ($i=1, 2$; $j=1, \ldots, d_i$) as the minimum number of different values that have to be combined with $f_{ij}$ given the marginals, i.e., $$l_{ij}=\min\{|F|:F\subseteq\{1,\ldots,d_{i'}\}, S(F)\leq f_{ij}<S(F)+f_{i'q}, \forall q\notin F\}$$

where $i'=3-i$, and $S(F)=\Sigma_{p\in F}f_{i'p}$. Then, $$D_{G_L} = \max_{i=1,2}\left\{\sum_{j=1}^{d_i} l_{ij}\right\}$$

is a lower bound on $D_G$ and $D_{G_L}\geq\max\{d_1, d_2\}$.

Theorem 3. For attribute set $G=(A_1, A_2)$, $u_{ij}$ ($i=1, 2$; $j=1, \ldots, d_i$) is defined a maximum number of different values that can be combined with $f_{ij}$ given the marginals, i.e., $$u_{ij}=\min\{d_{i'}, f_{ij}\cdot N\}$$

where $i'=3-i$. Then, $$D_{G_U} = \max_{i=1,2}\left\{\sum_{j=1}^{d_i} u_{ij}\right\}$$

is an upper bound on $$D_G \text{ and } D_{G_U} \leq \left\{\prod_{i=1}^{m} d_i, N\right\}.$$

Theorems 2 and 3 provide tighter lower and upper bounds than the trivial ones, as illustrated in the example.

Example 2. Consider the estimation of COLSCARD for $G=(A_1, A_2)$, with $N=10$, and $f_1=(0.4, 0.4, 0.2)$ and $f_2=(0.8, 0.1, 0.1)$. Clearly the trivial lower and upper bounds are 3 and 9 respectively. As will be described herein below, the estimated lower and upper bounds dictated by Theorems 2 and 3, on the other hand, are 4 and 5 respectively, which are tighter than the trivial bounds. To describe how the upper and lower bounds can be derived from Theorems 1 and 2, refer now to the following proof.

Computing the lower bound $D_{G_L}$ for $D_G$ can be done using the Algorithm 1, which implements Theorem 1, shown below.

sort $f_2$ ($i=1,2$) in descending order;

```
for i = 1 to 2 do
    i' = 3 - i;
    for j = 1 to d_i do
        k = 1;
        while f_{ij} > \sum_{i=1}^{k} f_{i'l} do
            k = k + 1
        end while
        l_{ij} = k
    end for
    lb_i = \sum_{j=1}^{d_i} l_{ij}
end for
D_{G_L} = \max_i \{lb_i\}
``` where for each $f_{ij}$, the corresponding $l_{ij}$ is calculated by finding out at least how many frequencies from the other attribute have to be combined with it, and then adding them up and getting a result.

Hence in this algorithm, the bounds for two attributes are sorted in ascending order. In this embodiment the frequency information ($f_1$) of $A_1$ is (0.4, 0.4, 0.2) and the frequency information ($f_2$) for $A_2$ is (0.8, 0.1, 0.1). First, the equation loops such that frequency each of the attributes of $A_1$, are compared consecutively with the accumulation of the attributes of $A_2$.

The first time 0.4>0.8 is not true, so $l_{ij}=1$. This is performed for all 3 frequencies of $A_1$ and end up with k=1 each time. The second time of the OUTER FOR loop with i=2 and i'=1 the comparison 0.8>0.4 for the first iteration of the inner FOR loop is true. The second inner loop iteration with 0.8>0.4+0.4 fails resulting in k=2.

The other inner FOR loops result in k=1 since the other frequencies of 0.1 and 0.1 in $f_1$ are less than 0.4, 0.4 and 0.2.

Assuming for the first round of the OUTER FOR loop the lower bound $1b_1$ below to 1+1+1=3, for the second round of the OUTER FOR loop, set $1b_2$=2+1+1=4. Therefore the lower bound is MAX(3,4)=4.

Obtaining the upper bound $D_{G_{ij}}$ for $D_G$ is much easier. For each $f_{ij}$, $u_{ij}$ is computed by simply comparing $f_{ij}$·N and $d_i$. Adding up the $u_{ij}$'s for each attribute and taking the lesser of the two sums give rise to the desired bound.

Based on Theorem 3, for N=10
i ranges from 1 to 2 for the 2 attributes
j from 1 to 3 for each of the 2 attributes, resulting in:
$u_{11}$=MIN(3, 0.4*10)=3
$u_{12}$=MIN(3, 0.4*10)=3
$u_{13}$=MIN(3, 0.2*10)=2
$u_{21}$=MIN(3, 0.8*10)=3
$u_{22}$=MIN(3, 0.1*10)=1
$u_{23}$=MIN(3, 0.1*10)=1
$D_{G_{ij}}$=MIN((3+3+2), (3+1+1))=MIN(8,5)=5

This is further compared with the product $d_1 * d_2$ which is 3*3=9 and the rows N=10. The tighter upper bound $D_{G_{ij}}$=MIN(5, 9, 10)=5.

The tighter bounds are applied as follows. In this example, if $D_G$>N then set $D_G$=N. If $D_G$>$D_{G_{ij}}$ then set $D_G$=$D_{G_{ij}}$, if $D_G$<$D_{G_L}$ then set $D_G$=$D_{G_L}$. Accordingly, in the above example when calculating $D_G$ based upon probability theory, the number of distinct value combinations is 5.39. Since 5.39 is greater than the upper bound of 5, $D_G$ can be set to 5. Although a specific example has been used, it is readily apparent to one of ordinary skill in the art that many examples could be utilized and they would be within the spirit and scope of the present invention. As one can readily recognize as the number of possible distinct combinations grows the ability to utilize a system and method in accordance with the present invention will significantly reduce the number of calculations required to provide the estimate.

Accordingly, a method, computer program product and system to estimate the number of distinct value combinations for a set of attributes in a database system is disclosed. By utilizing frequency information within the set of attributes an estimate for the number of distinct value combinations is provided. In a preferred embodiment, the number of distinct value combinations is estimated utilizing frequency information of the set of attributes based upon probability theory. Thereafter, bounds on the distinct value information combinations are provided utilizing the frequency information of the set of attributes. In so doing, an estimate for the number of distinct value combinations is provided.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method implemented by a computer system including a processor to estimate the number of distinct value combinations for a set of attributes in a table of a database system, the number of distinct value combinations being provided for a number of distinct values of each of the attributes in the set of attributes, the method comprising:

using the processor to utilize frequency information for the set of attributes to provide an estimate for the number of distinct value combinations, wherein the frequency information includes individual frequency statistics for each individual attribute in the set of attributes, the individual frequency statistics indicating the number of times each distinct value appears in each individual attribute in the set of attributes, wherein using the processor to utilize frequency information includes:

using the individual frequency statistics to determine a probability of occurrence of each specific value combination of the distinct values, and using the probability of occurrence of each specific value combination to provide the estimate for the number of distinct value combinations, including determining a lower number of distinct value combinations than a maximum number of distinct value combinations for the distinct values, wherein determining a lower number of distinct value combinations includes subtracting from the maximum possible number of distinct value combinations a sum of probabilities that the value combinations do not occur in the table, wherein the sum of probabilities is determined using the individual frequency statistics.

2. The method of claim 1 wherein the utilizing step further includes providing bounds on the distinct value combinations, wherein the bounds are determined utilizing the individual frequency statistics of the set of attributes.

3. The method of claim 2, wherein a lower bound of the bounds is defined by an equation comprising the greater of:

$$\max_{i=1,m} \left\{ \sum_{j=1}^{d_i} l_{ij} \right\} \text{ and } \max_{i=1,m} \{d_i\}$$

wherein m is a number of the attributes in the set of attributes;

lij is a minimum number of different distinct values for the individual attributes in the set of attributes that have to be combined with fij given the individual frequency statistics of each individual attribute;

di is the number of distinct values in the attribute i; and

{fij} is a tensor product of frequency vectors of all attributes.

4. The method of claim 2, wherein an upper bound of the bounds is defined by an equation comprising the lesser of:

$$\max_{i=1,m} \left\{ \sum_{j=1}^{d_i} u_{ij} \right\} \text{ and } \min\left\{ \prod_{i=1}^{m} d_i, N \right\}$$

wherein m is a number of attributes;

uij is a maximum number of different distinct values for the individual attributes in the set of attributes that can be combined with fij given the individual frequency statistics of each individual attribute;

{di} is a vector consisting of the number of distinct values for the individual attributes in the m number of attributes; and {fij} is a tensor product of frequency vectors of all attributes.

5. The method of claim 1 further comprising using the processor to utilize the estimate to determine a cost of a query execution plan that includes an access path for a query accessing the table of the database system.

6. The method of claim 2, wherein the bounds are tighter than trivial bounds, wherein an upper trivial bound is based on a size of the table and a product of the distinct values of the set of attributes, and wherein a lower trivial bound is based on a maximum of a number of distinct values of any of the individual attributes of the set of attributes.

7. A non-transitory computer readable storage medium storing program instructions implemented by a computer system for estimating the number of distinct value combinations for a set of attributes in a table of a database system, the number of distinct value combinations being provided for a number of distinct values of each of the attributes in the set of attributes, the program instructions for:
  utilizing frequency information for the set of attributes to provide an estimate for the number of distinct value combinations, wherein the frequency information includes individual frequency statistics for each individual attribute in the set of attributes, the individual frequency statistics indicating the number of times each distinct value appears in each individual attribute in the set of attributes,
  wherein utilizing the frequency information includes:
  using the individual frequency statistics to determine a probability of occurrence of each specific value combination of the distinct values, and
  using the probability of occurrence of each specific value combination to provide the estimate for the number of distinct value combinations, including determining a lower number of distinct value combinations than a maximum number of distinct value combinations for the distinct values, wherein determining a lower number of distinct value combinations includes subtracting from the maximum possible number of distinct value combinations a sum of probabilities that the value combinations do not occur in the table, wherein the sum of probabilities is determined using the individual frequency statistics.

8. The computer readable storage medium of claim 7 wherein the utilizing frequency information further includes providing bounds on the distinct value combinations, wherein the bounds are determined utilizing the individual frequency statistics of the set of attributes, wherein if the estimate is greater than an upper bound then the estimate is set to the upper bound and if the estimate is less than a lower bound then the estimate is set to the lower bound.

9. The computer readable storage medium of claim 8, wherein the bounds are tighter than trivial bounds, wherein an upper trivial bound is based on a product of the distinct values of the individual values of the set of attributes, and wherein a lower trivial bound is based on a maximum of a number of distinct values of any of the individual attributes of the set of attributes.

10. The computer readable storage medium of claim 7 wherein the program instructions further utilize the estimate to determine a cost of a query execution plan that includes an access path for a query accessing the table of the database system.

11. A data processing system for estimating the number of distinct value combinations for a set of attributes, the number of distinct value combinations being provided for a number of distinct values of each of the attributes in the set of attributes, the data processing system comprising:
  at least one storage element storing a table of a database system, the set of attributes applying to the table; and
  at least one processor utilizing frequency information for the set of attributes to provide an estimate for the number of distinct value combinations, wherein the frequency information includes individual frequency statistics for each individual attribute in the set of attributes, the individual frequency statistics indicating the number of times each distinct value appears in each individual attribute in the set of attributes.
  wherein using the processor utilizing the frequency information includes:
  using the individual frequency statistics to determine a probability of occurrence of each specific value combination of the distinct values, and
  using the probability of occurrence of each specific value combination to provide the estimate for the number of distinct value combinations, including determining a lower number of distinct value combinations than a maximum number of distinct value combinations for the distinct values, wherein determining a lower number of distinct value combinations includes subtracting from the maximum possible number of distinct value combinations a sum of probabilities that the value combinations do not occur in the table, wherein the sum of probabilities is determined using the individual frequency statistics.

12. The data processing system of claim 11 wherein the at least one processor utilizing frequency information further provides bounds on the distinct value combinations, wherein the bounds are determined utilizing the individual frequency statistics of the set of attributes.

13. The data processing system of claim 12, wherein the bounds are tighter than trivial bounds, wherein an upper trivial bound is based on a product of the distinct values of the individual values of the set of attributes, and wherein a lower trivial bound is based on a maximum of a number of distinct values of any of the individual attributes of the set of attributes.

14. The data processing system of claim 11 wherein the at least one processor utilizes the estimate to determine a cost of a query execution plan that includes an access path for a query accessing the table of the database system.

* * * * *